(12) United States Patent
Sun

(10) Patent No.: US 8,605,379 B1
(45) Date of Patent: Dec. 10, 2013

(54) DISK DRIVE AVERAGING PHASE-OFFSET DUE TO READER/WRITER GAP IN ORDER TO RECOVER EXTENDED SERVO DATA

(71) Applicant: Western Digital Technologies, Inc., Irvine, CA (US)

(72) Inventor: Zhenyu Sun, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/623,020

(22) Filed: Sep. 19, 2012

(51) Int. Cl.
 *G11B 5/09* (2006.01)
(52) U.S. Cl.
 USPC .............................................. 360/51; 360/75
(58) Field of Classification Search
 None
 See application file for complete search history.

(56) References Cited

U.S. PATENT DOCUMENTS

| | | | |
|---|---|---|---|
| 6,710,951 B1 * | 3/2004 | Cloke | 360/29 |
| 6,934,103 B2 * | 8/2005 | Chickanosky et al. | 360/51 |
| 6,937,414 B2 * | 8/2005 | Chickanosky | 360/51 |
| 7,400,464 B1 | 7/2008 | Katchmart | |
| 7,602,568 B1 | 10/2009 | Katchmart | |
| 7,675,703 B2 * | 3/2010 | Albrecht et al. | 360/51 |
| 7,773,328 B1 | 8/2010 | Katchmart et al. | |
| 7,880,992 B2 * | 2/2011 | Ozturk et al. | 360/51 |
| 7,995,304 B2 * | 8/2011 | Ozturk et al. | 360/77.04 |
| 8,107,180 B2 * | 1/2012 | Nishida et al. | 360/51 |
| 8,331,050 B1 * | 12/2012 | Zou et al. | 360/51 |
| 8,498,071 B2 * | 7/2013 | Grundvig et al. | 360/51 |
| 2003/0002197 A1 | 1/2003 | Seng et al. | |
| 2008/0239896 A1 * | 10/2008 | Kuroda | 369/47.48 |
| 2011/0102929 A1 * | 5/2011 | Kanno et al. | 360/51 |
| 2013/0033777 A1 * | 2/2013 | Hirano et al. | 360/51 |

\* cited by examiner

*Primary Examiner* — Hoa T Nguyen
*Assistant Examiner* — James L Habermehl

(57) ABSTRACT

A disk drive is disclosed comprising a disk comprising a plurality of servo tracks, wherein each servo track comprises a plurality of servo sectors, and a head actuated radially over the disk, wherein the head comprises a read element separated from a write element by a reader/writer gap. The head is positioned over a first servo track, and a clock is synchronized to servo data in first and second servo sectors of the first servo track. A first phase-offset of the clock is measured for the first servo sector, and a second phase-offset of the clock is measured for the second servo sector, wherein the first and second phase-offset correspond to an end of the reader/writer gap at the first servo track. The first and second phase-offset are averaged to generate an average phase-offset for the first servo track.

18 Claims, 5 Drawing Sheets

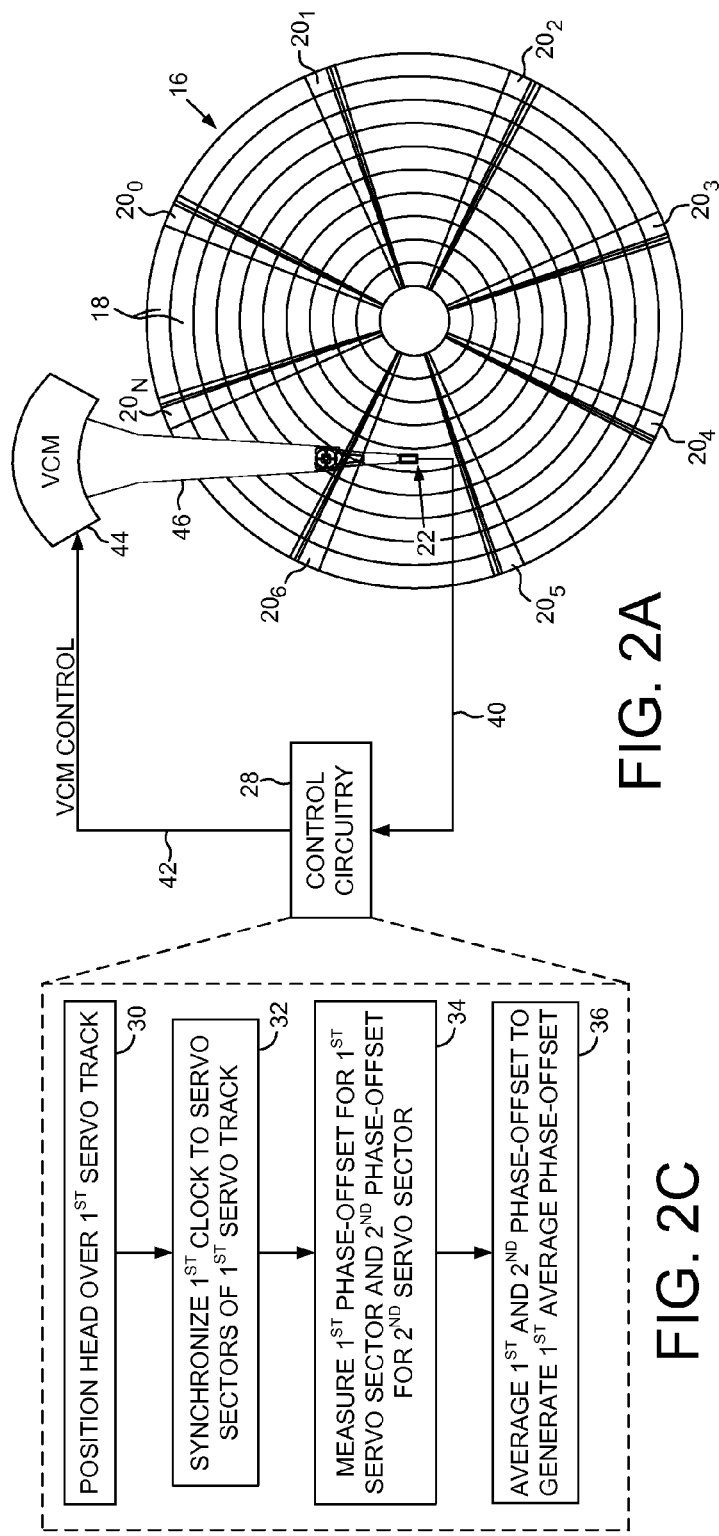
FIG. 2A
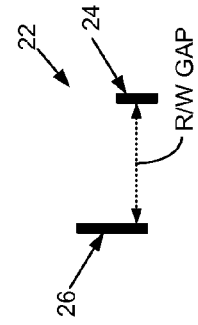
FIG. 2B
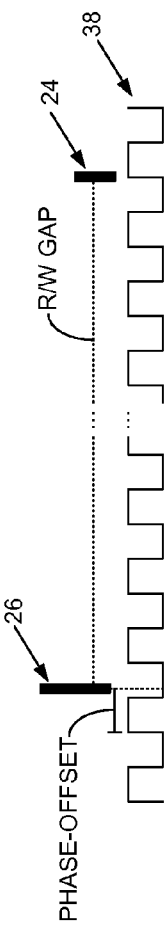
FIG. 2D
FIG. 2C

US 8,605,379 B1

DISK DRIVE AVERAGING PHASE-OFFSET DUE TO READER/WRITER GAP IN ORDER TO RECOVER EXTENDED SERVO DATA

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format comprising a number of servo sectors $6_0$-$6_N$ recorded around the circumference of the disk 2 that define a plurality of servo tracks 4, wherein data tracks are defined relative to the servo tracks (at the same or different radial density). Each servo sector $6_i$ may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

BRIEF DESCRIPTION OF THE DRAWINGS

FIG. 2A shows a disk drive according to an embodiment of the present invention comprising a head actuated over a disk.

FIG. 2B shows a head according to an embodiment of the present invention comprising a read element separated from a write element by a reader/writer gap.

FIG. 2C is a flow diagram according to an embodiment of the present invention wherein a phase-offset of a clock is averaged over multiple servo sectors, wherein the average phase-offset corresponds to the reader/writer gap.

FIG. 2D illustrates the average phase-offset corresponding to the reader/writer gap according to an embodiment of the present invention.

DETAILED DESCRIPTION

Figure 1:
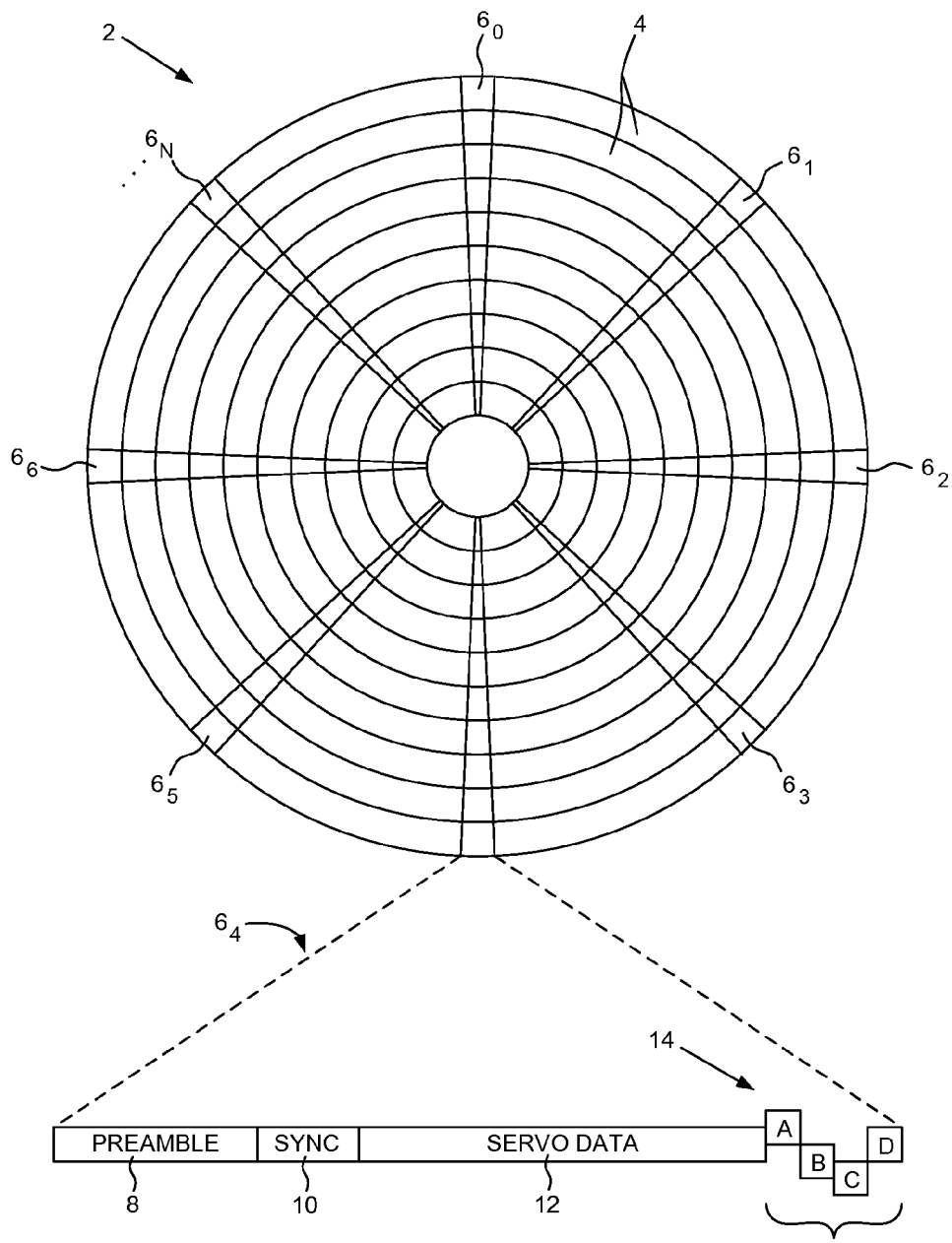
FIG. 1 shows a prior art disk format comprising a plurality of servo tracks defined by servo sectors.

FIG. 2A shows a disk drive according to an embodiment of the present invention comprising a disk 16 comprising a plurality of servo tracks 18, wherein each servo track comprises a plurality of servo sectors $20_0$-$20_N$, and a head 22 actuated radially over the disk 16, wherein the head 22 comprises a read element 24 separated from a write element 26 by a reader/writer gap (FIG. 2B). The disk drive further comprises control circuitry 28 operable to execute the flow diagram of FIG. 2C. The head is positioned over a first servo track (block 30), and a first clock is synchronized to servo data in first and second servo sectors of the first servo track (block 32), wherein a length of the reader/writer gap comprises a non-integer number of cycles of the first clock at the first servo track. A first phase-offset of the first clock is measured for the first servo sector, and a second phase-offset of the first clock is measured for the second servo sector (block 34), wherein the first and second phase-offset correspond to an end of the reader/writer gap at the first servo track. The first and second phase-offset are averaged to generate a first average phase-offset for the first servo track (block 36).

FIG. 2D illustrates an embodiment of the present invention wherein a length of the reader/writer gap comprises a non-integer number of cycles of the first clock 38 at the first servo track. The phase-offset shown in FIG. 2D corresponds to the fraction of a clock cycle remaining after the reader/writer gap. The phase-offset will vary based on the physical distance between the read element 24 and the write element 26 as well as the servo data rate and the radial location of the head 22. In one embodiment, the servo sectors $20_0$-$20_N$ are recorded at a constant data rate from the outer diameter of the disk 16 to the inner diameter as shown in FIG. 2A such that the servo sectors form servo wedges. Since the circumferential area of the servo tracks increases toward the outer diameter of the disk, the linear density of the servo data decreases with a corresponding decrease in the reader/writer gap relative to the servo data (and the first clock). This is because the physical length of the reader/writer gap remains constant whereas the physical length of the servo sectors increases toward the outer diameter of the disk. In an alternative embodiment, the servo sectors $20_0$-$20_N$ may be recorded using a zoned technique wherein the servo data rate is constant within each servo zone but increased across the servo zones toward the outer diameter so that the servo sectors form servo wedges within each servo zone. In an embodiment described below, an average phase-offset for a given servo track may be computed based on the average phase-offset measured for a number of servo tracks distributed radially across the disk.

In the embodiment of FIG. 2A, the control circuitry 28 processes a read signal 40 emanating from the read element 24 to demodulate the servo sectors $20_0$-$20_N$ and generate a position error signal (PES) representing an error between the actual position of the head and a target position relative to a target track. The control circuitry 28 filters the PES using a suitable compensation filter to generate a control signal 42 applied to a voice coil motor (VCM) 44 which rotates an actuator arm 46 about a pivot in order to actuate the head 22 radially over the disk 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern (FIG. 1) or a phase based servo pattern. In one embodiment, a plurality of data tracks may be defined relative to the servo tracks 18, wherein the radial density of the data tracks may be the same or different than the radial density of the servo tracks 18.

In one embodiment, extended data is written after one or more of the servo sectors of at least one servo track. In the embodiment of FIG. 2A, extended data is written after each servo sector such that the extended data forms a mini-wedge after each servo wedge. The extended data may comprise any suitable information, wherein in one embodiment the extended data comprises repeatable runout (RRO) information used by the servo system to position the head 22 over the disk 16. It is desirable to minimize the disk space consumed by the extended data in order to maximize the storage capacity of the disk drive. In one embodiment, the amount of extended data is reduced by omitting a preamble and sync mark used to synchronize to the extended data. Instead of synchronizing to a preamble and sync mark, the average phase-offset described above may be used to synchronize to the extended data. For example, the average phase-offset may be used to write the extended data synchronous with the servo data so that both the servo data and the extended data may be read using the same synchronous clock (after synchronizing to the preamble and sync mark at the beginning of a servo sector). In another embodiment, the extended data may be written asynchronous with the servo data, and the average phase-offset used to phase shift the signal samples of the read signal in order to recover the extended data. Both of these embodiments are described in greater detail below.

Figure 3A:
FIG. 3A shows an embodiment of the present invention wherein a phase-offset for a servo sector is measured relative to a preamble and sync mark written after the servo sector.
Figure 3B:
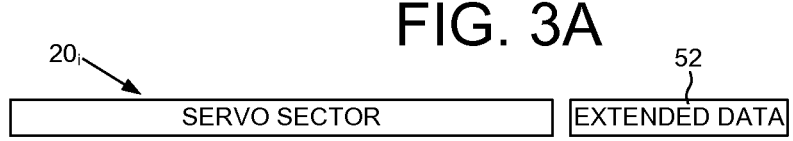
FIG. 3B shows an embodiment of the present invention wherein the average phase-offset is used to write extended data after a servo sector.

FIG. 3A shows an embodiment of the present invention for measuring the phase-offset corresponding to the reader/writer gap for a given servo sector $20_i$ of a servo track. During a first revolution of the disk, a first clock is synchronized to the servo sector $20_i$ and then a preamble 48 and sync mark 50 are written after the servo sector $20_i$ using the first clock. During a second revolution, a first clock is synchronized to the servo sector $20_i$ and a second clock is synchronized to the preamble 48 and sync mark 50 following the servo sector $20_i$. The phase-offset is then measured by comparing the phase-offset between the first and second clocks. The reader/writer gap is also measured and used to write extended data 52 after the servo sector $20_i$ as shown in FIG. 3B. That is, the extended data 52 is written soon after the write element 26 clears the end of the servo sector $20_i$ as determined by the length of the reader/writer gap. In one embodiment, the phase-offset is measured for a number of the servo sectors of a servo track, and the average phase-offset used to write the extended data 52 after at least one of the servo sectors.

Figure 4A:
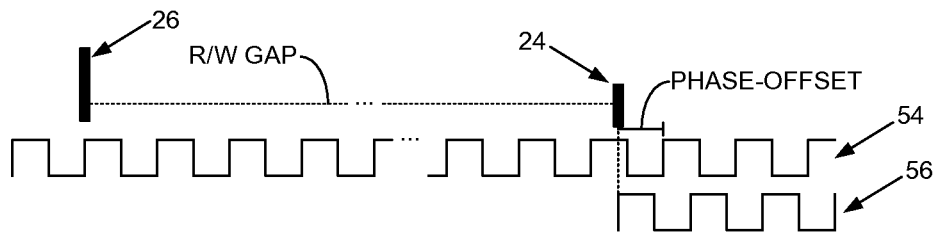
FIGS. 4A-4C illustrate an embodiment of the present invention wherein the average phase-offset is used to write extended servo data synchronous with the servo sector data.
Figure 4B:
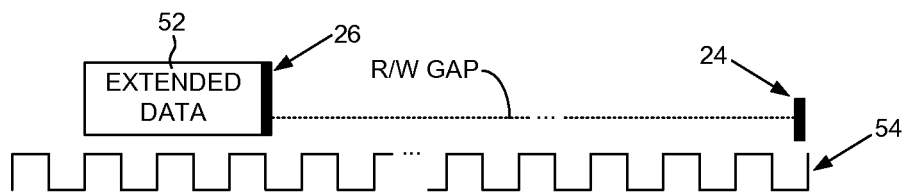
Figure 4C:
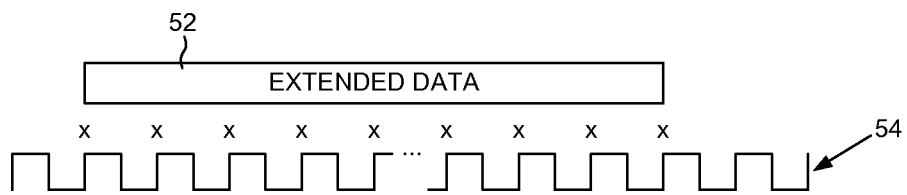

FIGS. 4A-4C illustrate an embodiment of the present invention wherein the average phase-offset is used to write the extended data 52 synchronous with the servo data so that both the servo data and the extended data may be read using the same synchronous clock (after synchronizing to the preamble and sync mark at the beginning of a servo sector). In this embodiment, a first clock 54 is synchronized to the servo data of a servo sector (relative to the read element 24), and a second clock 56 is generated offset from the first clock 54 by the average phase-offset as shown in FIG. 4A. The extended data 52 is then written to the disk using the second clock 56 as shown in FIG. 4B such that the extended data 52 is substantially synchronous with the first clock 54. In this manner, when the servo sector is read during normal operation as shown in FIG. 4C, the first clock 54 is synchronized to the servo sector in order to read the servo data, and then the first clock 54 is used to read the extended data 52 since the first clock 54 is already synchronized to the extended data 52, thereby obviating the need for a preamble and sync mark to read the extended data 52. In one embodiment, the first clock 54 is used to sample the read signal synchronously as illustrated by the "x" in FIG. 4C wherein the extended data 52 is sampled synchronously due to the synchronous write operation described above.

Figure 5A:
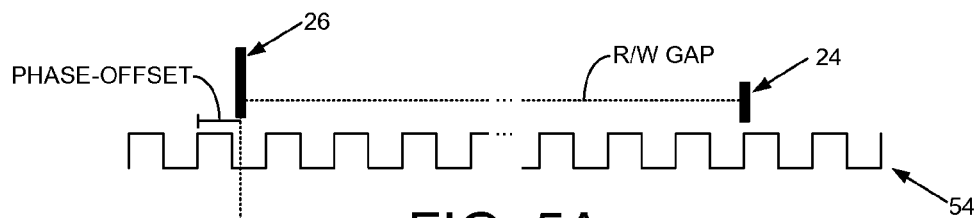
FIGS. 5A-5D illustrate an embodiment of the present invention wherein the average phase-offset is used to read the extended servo data by phase shifting the read signal samples.
Figure 5B:
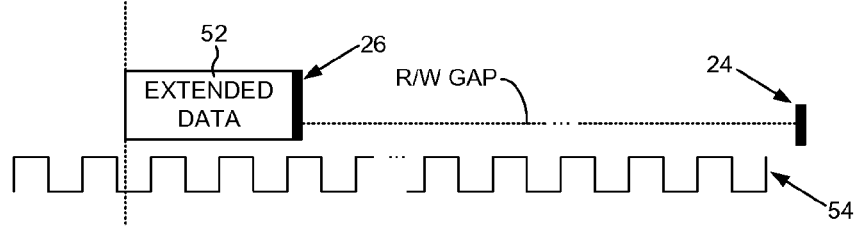
Figure 5C:
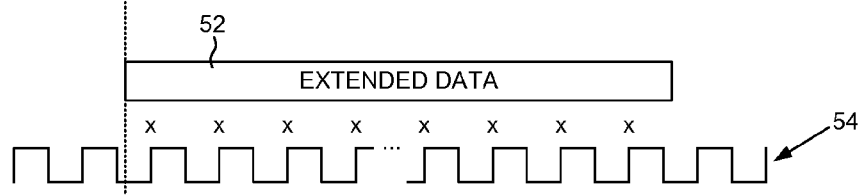
Figure 5D:
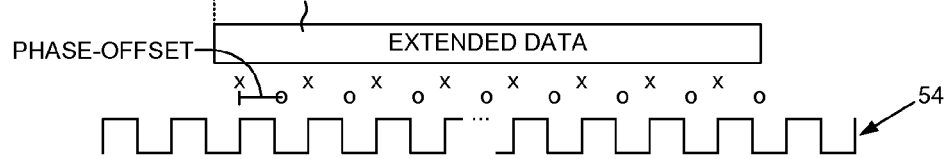

FIGS. 5A-5D illustrate an embodiment of the present invention wherein the average phase-offset is used to read the extended data by phase shifting the read signal samples. In this embodiment, the first clock 54 is synchronized to the servo data of a servo sector such that there is a phase-offset relative to the write element 26 as shown in FIG. 5A. The extended data 52 is written to the disk using the first clock 54 as shown in FIG. 5B such that the extended data 52 is written with a corresponding phase-offset as shown in FIG. 5B. When the servo sector and extended data 52 are read during normal operation using the first clock 54, the extended data 52 will be sampled with a phase-offset as shown in FIG. 5C (where the "x" represent the phase-offset signal samples). In this embodiment, the signal samples "x" are phase shifted based on the average phase-offset using any suitable technique (e.g., an interpolation filter) so that the resulting phase shifted signal samples "o" are substantially synchronized to the extended servo data 52 as shown in FIG. 5D. In one embodiment, the extended data 52 may be written with one or more bits of dummy data at the beginning to account for the phase shifting of the signal samples. That is, the dummy bit(s) may account for phase shifting the signal samples past one or more bits at the beginning of the extended data 52 during the read operation.

Figure 6A:
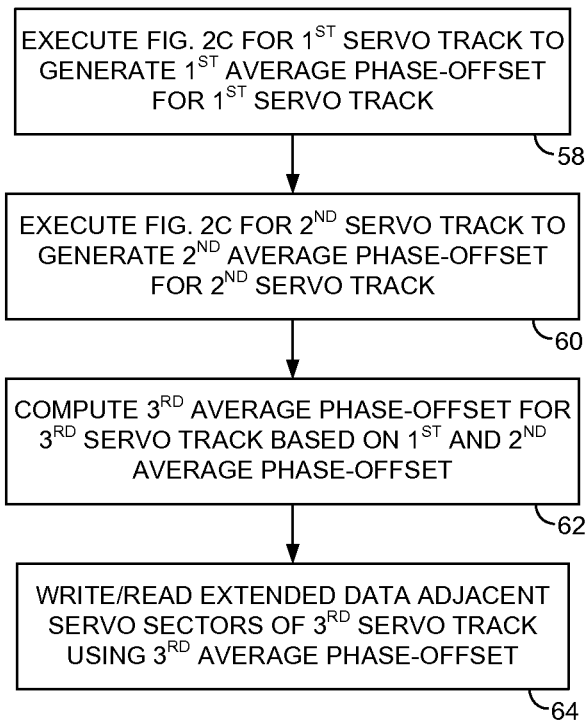
FIG. 6A is a flow diagram according to an embodiment of the present invention wherein an average phase-offset for a given servo track is computed in response to the average phase-offset measured for other servo tracks (e.g., using interpolation).

FIG. 6A is a flow diagram according to an embodiment of the present invention wherein the flow diagram of FIG. 2C is executed to generate a first average phase-offset for a first servo track (block 58), and executed to generate a second average phase-offset for a second servo track (block 60). A third average phase-offset for a third servo track is then computed based on the first and second average phase-offsets (block 62), and extended data is written/read adjacent servo sectors of the third servo track using the third average phase-offset (block 64). For example, the third average phase-offset may be generated by interpolating between the first and second average phase-offsets based on the radial location of the third servo track relative to the first and second servo tracks.

Figure 6B:
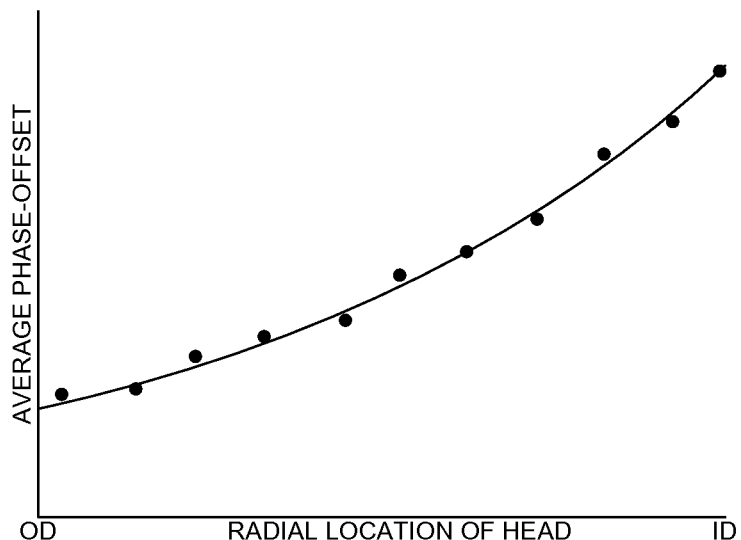
FIG. 6B illustrates an embodiment of the present invention wherein the average phase-offset measured for multiple servo tracks are curve fitted using any suitable function so that the average phase-offset for other servo tracks may be computed based on the function.

FIG. 6B shows an embodiment of the present invention wherein a plurality of average phase-offsets are measured for a plurality of servo tracks distributed radially across the disk 16. The measured average phase-offsets are curve fitted using any suitable function, such as by generating coefficients of a polynomial representing a best fit curve through the data points. An average phase-offset for a given servo track between the data points may then be computed based on the function. For example, the servo track number may be input into the function which then generates the corresponding average phase-offset used to write/read the extended data for the servo track.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks, wherein each servo track comprises a plurality of servo sectors;
   a head actuated radially over the disk, wherein the head comprises a read element separated from a write element by a reader/writer gap; and
   control circuitry operable to:
      position the head over a first servo track;
      synchronize a first clock to servo data in first and second servo sectors of the first servo track, wherein a length of the reader/writer gap comprises a non-integer number of cycles of the first clock at the first servo track;
      measure a first phase-offset of the first clock for the first servo sector and measure a second phase-offset of the first clock for the second servo sector, wherein the first and second phase-offset correspond to an end of the reader/writer gap at the first servo track; and
      average the first and second phase-offset to generate a first average phase-offset for the first servo track.

2. The disk drive as recited in claim 1, wherein the control circuitry is further operable to write extended servo data near a third servo sector of the first servo track in response to the first clock and the first average phase-offset.

3. The disk drive as recited in claim 2, wherein the control circuitry is further operable to write extended servo data near a plurality of the servo sectors of the first servo track in response to the first clock and the first average phase-offset.

4. The disk drive as recited in claim 2, wherein the control circuitry is further operable to:
   generate a second clock phase offset from the first clock based on the first average phase-offset; and
   write the extended servo data near the third servo sector in response to the second clock.

5. The disk drive as recited in claim 1, wherein the control circuitry is further operable to read extended servo data near a third servo sector of the first servo track in response to the first clock and the first average phase-offset.

6. The disk drive as recited in claim 5, wherein the control circuitry is further operable to:
   read the extended servo data to generate a read signal;
   sample the read signal in response to the first clock to generate signal samples;
   phase shift the signal samples in response to the first average phase-offset to generate phase-shifted signal samples; and
   detect the extended servo data in response to the phase-shifted signal samples.

7. The disk drive as recited in claim 1, wherein the control circuitry is further operable to:
   position the head over a second servo track;
   synchronize the first clock to servo data in fourth and fifth servo sectors of the second servo track, wherein the length of the reader/writer gap comprises a non-integer number of cycles of the first clock at the second servo track;
   measure a third phase-offset of the first clock for the fourth servo sector and measure a fourth phase-offset of the first clock for the fifth servo sector, wherein the third and fourth phase-offset correspond to an end of the reader/writer gap at the second servo track;
   average the third and fourth phase-offset to generate a second average phase-offset for the second servo track;
   write extended servo data near a sixth servo sector of the second servo track; and
   perform one of:
      write the extended servo data near the sixth servo sector in response to the first clock and the second average phase-offset; and
      read the extended servo data near the sixth servo sector in response to the first clock and the second average phase-offset.

8. The disk drive as recited in claim 7, wherein the control circuitry is further operable to:
   position the head over a third servo track;
   compute a third average phase-offset in response to the first and second average phase-offset;
   write extended servo data near a seventh servo sector of the third servo track; and
   perform one of:
      write the extended servo data near the seventh servo sector in response to the first clock and the third average phase-offset; and
      read the extended servo data near the seventh servo sector in response to the first clock and the third average phase-offset.

9. The disk drive as recited in claim 8, wherein the control circuitry is further operable to write extended servo data near a plurality of the servo sectors of the third servo track in response to the first clock and the third average phase-offset.

10. A method of operating a disk drive, the disk drive comprising a disk comprising a plurality of servo tracks, wherein each servo track comprises a plurality of servo sectors, and a head actuated radially over the disk, wherein the head comprises a read element separated from a write element by a reader/writer gap, the method comprising:
   positioning the head over a first servo track;
   synchronizing a first clock to servo data in first and second servo sectors of the first servo track, wherein a length of the reader/writer gap comprises a non-integer number of cycles of the first clock at the first servo track;
   measuring a first phase-offset of the first clock for the first servo sector and measure a second phase-offset of the first clock for the second servo sector, wherein the first and second phase-offset correspond to an end of the reader/writer gap at the first servo track; and
   averaging the first and second phase-offset to generate a first average phase-offset for the first servo track.

11. The method as recited in claim 10, further comprising writing extended servo data near a third servo sector of the first servo track in response to the first clock and the first average phase-offset.

12. The method as recited in claim 11, further comprising writing extended servo data near a plurality of the servo sectors of the first servo track in response to the first clock and the first average phase-offset.

13. The method as recited in claim 11, further comprising:
generating a second clock phase offset from the first clock based on the first average phase-offset; and
writing the extended servo data near the third servo sector in response to the second clock.

14. The method as recited in claim 10, further comprising reading extended servo data near a third servo sector of the first servo track in response to the first clock and the first average phase-offset.

15. The method as recited in claim 14, further comprising:
reading the extended servo data to generate a read signal;
sampling the read signal in response to the first clock to generate signal samples;
phase shifting the signal samples in response to the first average phase-offset to generate phase-shifted signal samples; and
detecting the extended servo data in response to the phase-shifted signal samples.

16. The method as recited in claim 10, the method further comprising:
positioning the head over a second servo track;
synchronizing the first clock to servo data in fourth and fifth servo sectors of the second servo track, wherein the length of the reader/writer gap comprises a non-integer number of cycles of the first clock at the second servo track;
measuring a third phase-offset of the first clock for the fourth servo sector and measure a fourth phase-offset of the first clock for the fifth servo sector, wherein the third and fourth phase-offset correspond to an end of the reader/writer gap at the second servo track;
averaging the third and fourth phase-offset to generate a second average phase-offset for the second servo track;
writing extended servo data near a sixth servo sector of the second servo track; and
performing one of:
writing the extended servo data near the sixth servo sector in response to the first clock and the second average phase-offset; and
reading the extended servo data near the sixth servo sector in response to the first clock and the second average phase-offset.

17. The method as recited in claim 16, further comprising:
positioning the head over a third servo track;
computing a third average phase-offset in response to the first and second average phase-offset;
writing extended servo data near a seventh servo sector of the third servo track; and
performing one of:
writing the extended servo data near the seventh servo sector in response to the first clock and the third average phase-offset; and
reading the extended servo data near the seventh servo sector in response to the first clock and the third average phase-offset.

18. The method as recited in claim 17, further comprising writing extended servo data near a plurality of the servo sectors of the third servo track in response to the first clock and the third average phase-offset.

* * * * *